United States Patent [19]

Schroeter et al.

[11] 4,210,699
[45] Jul. 1, 1980

[54] ABRASION RESISTANT SILICONE COATED POLYCARBONATE ARTICLE

[75] Inventors: Siegfried H. Schroeter, Schenectady; Daniel R. Olson, Clifton Park, both of N.Y.

[73] Assignee: General Electric Company, Pittsfield, Mass.

[21] Appl. No.: 956,874

[22] Filed: Nov. 1, 1978

[51] Int. Cl.² ............... G02B 1/04; B32B 27/30; B32B 27/14
[52] U.S. Cl. ............... 428/331; 351/166; 427/160; 427/167; 427/387; 428/387; 428/404; 428/412; 428/447; 428/451; 428/520; 428/522; 428/911; 428/918
[58] Field of Search ............... 428/412, 520, 522, 911, 428/918, 447, 451, 446, 387, 331, 404; 427/160, 164, 167, 387; 351/166

[56] References Cited

U.S. PATENT DOCUMENTS

| | | | |
|---|---|---|---|
| 2,976,184 | 3/1961 | Blatz | 428/331 |
| 3,379,607 | 4/1968 | Foster et al. | 428/447 |
| 3,451,838 | 6/1969 | Burzynski et al. | 428/412 |
| 3,488,215 | 1/1970 | Shepherd et al. | 428/339 |
| 3,582,398 | 6/1971 | Ringler | 428/412 |
| 3,637,416 | 1/1972 | Misch et al. | 428/412 |
| 3,661,685 | 5/1972 | Osteen | 428/412 X |
| 3,707,397 | 12/1972 | Gagnon | 428/412 |
| 3,865,619 | 2/1975 | Pennewiss et al. | 428/442 |
| 3,953,115 | 4/1976 | French et al. | 351/166 |
| 3,968,305 | 7/1976 | Oshima et al. | 428/334 |
| 3,968,309 | 7/1976 | Matsuo et al. | 428/409 |
| 3,978,178 | 8/1976 | Oshima et al. | 264/25 |
| 3,986,997 | 10/1976 | Clark | 351/166 |
| 4,026,826 | 5/1977 | Yoshida et al. | 260/2 S |
| 4,027,073 | 5/1977 | Clark | 351/166 |
| 4,028,300 | 6/1977 | Wake et al. | 260/31.2 R |
| 4,041,120 | 8/1977 | Oshima et al. | 264/171 |
| 4,045,602 | 8/1977 | Sommer et al. | 427/386 |
| 4,064,286 | 12/1977 | Hahn | 427/44 |
| 4,080,476 | 3/1978 | Laskey | 428/413 |
| 4,103,065 | 7/1978 | Gagnon | 428/336 |
| 4,159,206 | 6/1979 | Armbruster et al. | 428/447 X |
| 4,160,750 | 7/1979 | Columbus et al. | 428/522 X |
| 4,160,853 | 7/1979 | Ammons | 428/412 X |

*Primary Examiner*—Harold Ansher
*Attorney, Agent, or Firm*—Myron B. Kapustij; William F. Mufatti

[57] ABSTRACT

A shaped non-opaque coated polycarbonate article having improved abrasion and chemical solvent resistance comprising a polycarbonate substrate having disposed on the surface thereon a non-opaque primer layer comprised of a thermoplastic acrylic polymer containing functional groups and disposed on said primer layer a non-opaque top coat comprised of a colloidal silica filled thermoset organopolysiloxane.

26 Claims, No Drawings

ABRASION RESISTANT SILICONE COATED POLYCARBONATE ARTICLE

This invention relates to non-opaque abrasion and chemical solvent resistant silica filled organopolysiloxane coated shaped polycarbonate articles wherein the silica filled organopolysiloxane top coat is uniformly and tenaciously adhered to the polycarbonate substrate and to a process for producing such an article. More particularly, the present invention relates to a silica filled organopolysiloxane coated polycarbonate article having a primer layer disposed between the polycarbonate substrate and the silica filled organopolysiloxane top coat comprising a thermoplastic acrylic polymer containing functional groups. The process for producing said article comprises priming the polycarbonate substrate with an adhesion promoting thermplastic acrylic polymer containing functional groups by forming a film of said acrylic polymer on the surface of the polycarbonate article; applying onto the primed surface a further curable silica filled organopolysiloxane top coat composition; and curing the silica filled further curable organopolysiloxane to form a uniform and tenaciously adhered abrasion and chemical resistant top coat.

BACKGROUND OF THE INVENTION

The use of transparent glazing materials utilizing polycarbonate resin as a structural component for windows, windshields and the like are well known. While these polycarbonate resins are easily fabricated into the desired shape and have excellent physical and chemical properties, such as being less dense than glass and having more breakage resistance than glass, their abrasion and chemical solvent resistance is relatively low.

In order to overcome this relatively low abrasion resistance and to otherwise improve the surface characteristics of the polycarbonate substrate, various coatings have been applied to the polycarbonate resins. U.S. Pat. No. 3,582,398 describes a fabricated polycarbonate part having improved optical properties consisting of a polycarbonate substrate having a transparent coating thereon consisting of a thermoplastic polymethylmethacrylate. U.S. Pat. No. 4,061,652 describes a coating for polycarbonate resins comprised of (i) an acrylic resin which is a mixture of olefinically unsaturated organic monomers in combination with an acrylic polymer, and (ii) certain urethanes of hydroxybenzotriazoles and hydroxybenzophenones in combination with certain catalysts. U.S. Pat. Nos. 3,451,838, 3,986,997 and 4,027,073 disclose organopolysiloxane coating compositions and techniques for the application of these organopolysiloxane coatings onto polycarbonate surfaces. While these coatings have many desirable properties, e.g., they are hard, abrasion resistant, and chemical solvent resistant, these organopolysiloxane coatings do not in all instances possess the requisite degree of uniform adherence to and durability on these polycarbonate surfaces. U.S. Pat. No. 3,707,397 describes a process for providing a hard coating on, inter alia, polycarbonate articles, said process including priming the polycarbonate surface with an adhesion promoting thermosettable acrylic and applying an organopolysiloxane onto the primed surface. An article produced by this process, while possessing acceptable initial adherence of the organopolysiloxane to the substrate, suffers from the disadvantage that upon prolonged exposure to weathering, and particularly to sunlight, the organopolysiloxane generally tends to lose its initial adherence to the substrate. Furthermore, as the thickness of the thermoset acrylic primer layer increases, the abrasion resistance of the coated article generally decreases. There thus remains a need for non-opaque polycarbonate articles having uniformly, tenaciously and durably adhered abrasion and chemical resistant coatings thereon, and it is a primary object of the present invention to provide such articles and a relatively simple and economical process for producing these articles.

DESCRIPTION OF THE INVENTION

This invention relates to non-opaque colloidal silica filled organopolysiloxane coated polycarbonate articles having a thermoplastic functional group containing acrylic polymer adhesion promoting primer layer disposed between the polycarbonate surface and the organopolysiloxane and to a process for producing these articles.

In the practice of the present invention, prior to the application of the silica gel organopolysiloxane coating to the polycarbonate surface, the surface is first primed by the application thereon of a primer layer containing a thermoplastic acrylic polymer having functional groups.

The aromatic carbonate polymer of the instant invention has recurring units of the formula:

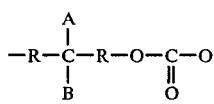   I.

wherein each —R— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining

atom form a cycloalkane radical, the total number of carbon atoms in A and B being up to 12.

The aromatic carbonate polymer of this invention may be prepared by methods well known in the art and as described in U.S. Pat. No. 3,989,672 all of which are incorporated by reference.

Also, included herein are branched polycarbonates wherein a polyfunctional aromatic compound is reacted with the dihydric phenol and carbonate precursor to provide a thermoplastic randomly branched polycarbonate wherein the recurring units of formula I. contain branching groups.

The preferred polycarbonate resins may be derived from the reaction of bisphenol-A and phosgene. These polycarbonates have from 10–400 recurring units of the formula:

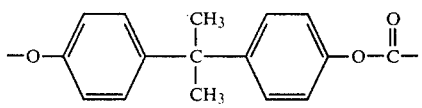

II.

The polycarbonate should have an intrinsic viscosity between 0.3 and 1.0, preferably from 0.40 to 0.65 as measured at 25° C. in methylene chloride.

The term "thermoplastic acrylic polymer having functional groups" as used herein is meant to embrace within its scope those thermoplastic polymers resulting from the polymerization of one or more substituted acrylic or methacrylic ester monomers represented by the general formula $$CH_2=CY-COOR^1X \qquad \text{III.}$$

wherein Y is H or a methyl radical; $R^1$ is an alkyl group, preferably an alkyl group containing from 1 to about 20 carbon atoms; and X is a hydroxyl, carboxyl, amine, epoxide, amide, SH, $SO_3H$, $COOR^2$ and $Si(OR^3)_3$ group, wherein $R^2$ and $R^3$ are alkyl groups, preferably alkyl groups containing from 1 to about 20 carbon atoms. Copolymers resulting from the polymerization of two or more of substituted acrylic ester and substituted methacrylic ester monomers are also included within the term "thermoplastic acrylic polymer having functional groups" as it appears herein. Also included within the term "thermoplastic acrylic polymers containing functional groups" as used herein are copolymers resulting from the polymerization of acrylic acid ester, i.e., acrylate, monomers and/or methacrylic acid esters, i.e., methacrylate, monomers with the aforedescribed substituted acrylic ester or substituted methacrylic ester monomers. Exemplary acrylate and methacrylate monomers which can be copolymerized with the substituted acrylic ester and/or substituted methacrylic ester monomers to form the thermoplastic acrylic polymers containing functional groups include methyl acrylate, ethyl acrylate, butyl acrylate, 2-ethylhexylacrylate, methyl methacrylate, ethyl methacrylate, butyl methacrylate, hexyl methacrylate, etc. Examples of copolymers of this type include copolymers containing ethyl methacrylate and hydroxyethyl methacrylate, ethyl methacrylate and γ-methacryloxypropyltrimethoxysilane, methyl acrylate and hydroxyethyl acrylate, and the like.

The polymerization of the above monomeric substituted acrylate and methacrylates to provide the thermoplastic acrylic polymer having functional groups useful in the practice of the present invention may be accomplished by any of the well known polymerization techniques.

Typical substituted acrylic and methacrylic ester monomers represented by formula III are set forth in Table I.

TABLE I $CH_2=C(CH_3)COOCH_2CH_2OH$
$CH_2=CHCOOCH_2CH_2OH$
$CH_2=CHCOOCH_2CHOHCH_3$
$CH_2=CHCOOCH_2CHNH_2CH_3$
$CH_2=CCH_3COOCH_2CH_2CH_2NH_2$
$CH_2=CHCOOCH_2CH_2NH_2$
$CH_2=CHCOOCH_2CH_2Si(OCH_3)_3$
$CH_2=CCH_3COOCH_2CH_2CH_2Si(OCH_3)_3$
$CH_2=CHCOOCH_2CH_2COOH$
$CH_2=CCH_3COOCH_2CH_2CH_2CH_2COOH$
$CH_2=CCH_3COO(CH_2)_6SH$ $$CH_2=CH\ COO\ CH_2\underset{\underset{CH_2SO_3H}{|}}{CH}-CH_3$$

$CH_2=CH\ COO\ CH_2CH_2CH_2CONH_2$ $$CH_2=CCH_3COOCH_2\underset{\underset{COOCH_2}{|}}{CH}CH_3$$

$CH_2=CCH_3\ COO\ CH_2CH_2CH_2COOCH_2CH_3$

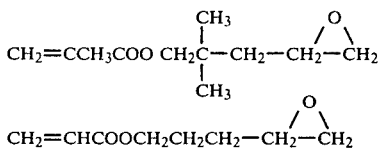

The term "thermoplastic acrylic polymers containing functional groups" as used herein thus includes homopolymers attained from the polymerization of a substituted acrylic ester or substituted methacrylic ester monomer, copolymers obtained from the polymerization of two or more substituted acrylic ester monomers, copolymers obtained from the polymerization of two or more substituted methacrylic ester monomers, copolymers obtained from the polymerization of at least one substituted acrylic ester monomer with at least one substituted methacrylic ester monomer, and copolymers obtained from the polymerization of at least one substituted methacrylic ester and/or substituted acrylic ester monomer with at least one acrylic ester and/or methacrylic ester monomers.

Mixtures of two or more of the aforedescribed homopolymers or copolymers can also be used in the practice of the present invention.

For acceptable results, the thermoplastic acrylic polymers containing functional groups should have a molecular weight of at least 20,000, and preferably at least 50,000.

The thermoplastic acrylic polymers containing functional groups of the instant invention differ from thermosettable acrylic polymers in that these thermoplastic polymers are formed and applied as primers under conditions such that these functional groups do not react between themselves to effect a cross-linkage between the polymers. Thus, the primer layer contains thermoplastic acrylic polymers containing functional groups.

The thermoplastic acrylic polymers containing functional groups are in general applied as primers from a primer composition containing said thermoplastic acrylic polymers and a volatile solvent, either organic or inorganic in nature, which is inert, i.e., will not react with the polycarbonate part to be treated, but which is capable of dissolving the thermoplastic acrylic polymers. Generally, the concentrations of the thermoplastic acrylic polymer in the priming composition ranges from about 0.5 to about 25 percent by weight, preferably from about 1 to about 15 percent. Examples of suitable solvents include ethylene glycol diacetate, butoxy-ethanol, methylene-dichloride, 1,2-dichloroethylene, chloroform, benzene and toluene.

The primer compositions of the instant invention may also optionally contain various flatting agents, ultraviolet light absorbent agents, surface-active agents and thixotropic agents. All of these additives and the use thereof are well known in the art and do not require extensive discussions. Therefore, only a limited number will be referred to, it being understood that any compounds possessing the ability to function in such a manner, i.e., as a flatting agent, surface-active agent, and ultraviolet light absorbent agents can be used.

The various surface-active agents, including anionic, cationic and nonionic surface-active agents are described in *Kirk-Othmer Encyclopedia of Chemical Technology*, Vol. 19, Interscience Publishers, New York, 1969, pp. 507–593, and *Encyclopedia of Polymer Science and Technology*, Vol. 13, Interscience Publishers, New York, 1960, pp. 477–486, both of which are references and incorporated herein.

Exemplary ultraviolet light absorbent compounds or stabilizers include those of the hydroxy benzophenone or benzotriazole series. Examples of these are: 2-hydroxy-4-n-octoxybenzophenone, substituted hydroxyphenylbenzotriazole, 2-(2'-hydroxy-5'-methylphenyl)-benzotriazole, and 2-hydroxy-4-methoxybenzophenone. Further examples of ultraviolet light absorbers which may be used in the practice of this invention may be found in U.S. Pat. No. 3,043,709. In general, the amount of the ultraviolet light absorber may vary from about 0.5 to about 15 percent by weight based upon the weight of the priming composition.

A uniform film of the primer composition is applied onto the polycarbonate surface by any of the known means such as dipping, spraying, roll-coating and the like. After the formed polycarbonate part is coated with the primer composition, the inert volatile solvent may be removed by drying the coated article until the volatile solvent evaporates, leaving a primer layer or coating containing the thermoplastic acrylic polymer containing functional groups on the polycarbonate surface to which the primer composition was applied. The drying operation may be hastened by the use of drying apparatus such as, for example, a drying oven. Generally, the primer layer is a uniform film having a thickness varying between about 0.002 mil to about 1 mil, preferably between about 0.01 mil to about 0.5 mil.

After the polycarbonate article which is to be coated has been primed by the application of the primer composition and the evaporation of the solvent component of the primer composition, the primed surface of the polycarbonate article is then coated with the silica filled organopolysiloxane coating. In the practice of this invention, a silica filled organopolysiloxane coating composition containing a further curable organopolysiloxane and colloidal silica is applied onto the cured primer and is then cured to form a thermoset silica filled organopolysiloxane coating.

The silica filled further curable organopolysiloxane top coat composition is disclosed in U.S. Pat. Nos. 3,986,997 and 4,027,073 and comprises a dispersion of colloidal silica in a lower aliphatic alcohol-water solution of the partial condensate of a silanol having the formula $$R^4Si(OH)_3 \qquad \text{IV.}$$

wherein $R^4$ is selected from the group consisting of alkyl radicals containing from 1 to 3 carbon atoms, the vinyl radical, the 3,3,3-trifluoropropyl radical, the gamma-glycidoxypropyl radical and the gamma-methacryloxypropyl radical, with at least 70 percent by weight of said silanol being $CH_3Si(OH)_3$. This composition generally contains from about 10 to about 50 percent by weight of solids, said solids consisting essentially of a mixture of from about 10 to about 70 percent by weight of colloidal silica and from about 30 to about 90 percent by weight of the partial condensate of a silanol. The partial condensate of a silanol, i.e., a siloxanol, is obtained, preferably, entirely from the condensation of $CH_3Si(OH)_3$, however, the partial condensate may also optionally be comprised of a major portion which is obtained from the condensation of $CH_3Si(OH)_3$ and a minor portion which is obtained from the condensation of monoethyltrisilanol, monopropyltrisilanol, monovinyltrisilanol, mono gamma-methacryloxy-propyltrisilanol, mono gamma-glycidoxypropyltrisilanol, or mixtures thereof. The composition further contains sufficient acid to provide a pH in the range of 3.0 to 6.0. The pH is maintained in this range in order to prevent premature gellation and increase the shelf life of the silica filled organopolysiloxane top coat composition and to obtain optimum properties in the cured coating. Suitable acids include both organic and inorganic acids such as hydrochloric, chloroacetic, acetic, citric, benzoic, formic, propionic, maleic, oxalic, glycolic and the like. The acid can be added to either the silane, which hydrolyzes to form the silanol component of the composition, or the hydrosol prior to mixing the two components.

The trisilanol component of the top coat composition of the present invention is generated in situ by the addition of the corresponding trialkoxysilanes to aqueous dispersions of colloidal silica. Suitable trialkoxysilanes are those containing methoxy, ethoxy, isopropoxy and t-butoxy substituents. Upon generation of the silanol in the acidic aqueous medium, there is condensation of the hydroxyl substituents to form —Si—O—Si bonding. The condensation is not complete, but rather the siloxane retains an appreciable quantity of silicon-bonded hydroxyl groups, thus rendering the organopolysiloxane polymer soluble in the water-alcohol solvent. This soluble partial condensate can be characterized as a siloxanol polymer having at least one silicon-bonded hydroxyl group per every three —SiO—units. During curing of the top coating composition on the primer, these residual hydroxyl groups condense to give a silsesquioxane, $R^4SiO_{3/2}$.

The silica component of the top coat composition is present in the form of colloidal silica. Aqueous colloidal silica dispersions generally have a particle size in the range of 5 to 150 millimicrons in diameter. These silica dispersions are prepared by methods well-known in the art and are commercially available. It is preferred to use colloidal silica having a particle size in the range of 10 to 30 millimicrons in diameter in order to obtain dispersions having a greater stability and to provide top coatings having superior optical properties.

The silica filled organopolysiloxane top coat compositions are prepared by adding trialkoxysilanes to colloidal silica hydrosol and adjusting the pH to a range of 3.0 to 6.0 by the addition of acid. As mentioned previously, the acid can be added to either the silane or the silica hydrosol before the two components are mixed. Alcohol is generated during the hydrolysis of the trialkoxy silanes to the trisilanols. Depending upon the percent solids desired in the final coating composition, additional alcohol, water, or a water-miscible solvent can be added. Suitable alcohols are the lower aliphatic alcohols such as methanol, ethanol, isopropanol, t-butanol, and mixtures thereof. Generally, the solvent system should contain from about 20 to about 75 weight percent alcohol to ensure solubility of the siloxanol formed by the condensation of the silanol. If desired, a minor amount of an additional water-miscible polar solvent such as acetone, butyl cellosolve, and the like can be added to the water-alcohol solvent system. Generally, sufficient alcohol or water-alcohol solvent is added to give a composition containing from about 10 to about 50 percent by weight of solids, said solids generally comprising from about 10 to about 70 percent by weight of colloidal silica and from about 30 to about 90 percent by weight of the partial condensate of the silanol. The composition is allowed to age for a short period of time to ensure formation of the partial condensate of the silanol, i.e., the siloxanol. This condensation occurs upon generation of the silanol in the acidic aqueous medium through the hydroxyl substituents to form Si—O—Si bonding. The condensation is not complete, resulting in a siloxane having an appreciable quantity of silicon-bonded hydroxyl group. This aged, silica filled further curable organopolysiloxane top coat composition is then applied onto the primed polycarbonate by any of the commonly known methods such as dipping, spraying, flow-coating and the like. After the top coat composition is applied to the primed polycarbonate, the polycarbonate is air dried to evaporate the volatile solvents from the top coat composition. Thereafter, heat is applied to cure the top coat. During curing, the residual hydroxyls of the siloxane condense to give a silsesquioxane, $R^4SiO_{3/2}$. The result is a silica filled cross-linked organopolysiloxane top coat which is tenaciously adhered to the substrate and is highly resistant to scratching, abrasion, chemical solvents, and marring. Generally, the top coat contains from about 10 to about 70 weight percent silica and from about 30 to about 90 weight percent of the organopolysiloxane present as the silsesquioxane $R^4SiO_{3/2}$.

The thickness of the top-coat generally is dependent upon the method of application and upon the weight percent solids present in silica filled further curable organopolysiloxane top coat composition. In general, the higher the percent solids, and the longer the application time, the greater the thickness of the top coat. It is preferred that the cured top coat have a thickness of from about 0.1 to about 0.5 mils, more preferably from 0.15 to about 0.4 mils, and most preferably from about 0.2 to about 0.25 mils.

Another embodiment of the present invention is a process of producing a mar, abrasion, scratch and chemical resistant polycarbonate article. The process comprises the steps of: (i) applying onto the polycarbonate a primer composition containing a thermoplastic acrylic polymer containing functional groups and a solvent; (ii) evaporating the solvent to leave a solid primer layer containing a thermoplastic acrylic polymer containing functional groups on the polycarbonate surface; (iii) applying a silica filled further curable organopolysiloxane top coat composition onto said primer layer, the top coat composition comprising a dispersion of colloidal silica in a lower alkanol-water solution of the partial condensate of a silanol of the formula $R^4Si(OH)_3$ in which $R^4$ is selected from the group consisting of alkyl radicals containing from 1 to 3 carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$; (iv) evaporating off the volatile solvents present in the top coat composition; and (v) curing the top coating by the application of heat thereto to form a silica filled thermoset organopolysiloxane, i.e., a silsesquioxane.

PREFERRED EMBODIMENT OF THE INVENTION

In order that those skilled in the art may better understand how the present invention may be practiced, the following examples are given by way of illustration and not by way of limitation.

EXAMPLE 1

An aromatic polycarbonate is prepared by reacting 2,2-bis(4-hydroxyphenol)propane and phosgene in the presence of an acid acceptor and a molecular weight regulator and having an intrinsic viscosity of 0.57. The product is then fed to an extruder, which extruder is operated at about 265° C. and the extrudate is comminuted into pellets.

The pellets are then injection molded at about 315° C. into test panels of about 4 in. by 4 in. by about ⅛ in. thick. The test panels are subjected to an abrasion test. The abrasion test is one wherein test panels having a ¼ inch diameter hole cut in the center are subjected to a Taber Abraser. The Taber Abraser is equipped with CS-10F wheels which are resurfaced every 200 cycles by abrading for 25 cycles on an S-11 refacing disc. The weights used in combination with the CS-10F wheels are 500 gm. weights. Initial measurements of % Haze are made at four places around the future wear track of the sample using a Gardner Hazemeter. The sample is abraded for 300 cycles, cleaned with isopropanol, and the % Haze is remeasured at the same four places. The four differences in % Haze are calculated and averaged to give the Δ% Haze. The results of this abrasion test are set forth in Table II.

EXAMPLE 2

A colloidal silica filled organopolysiloxane top coat composition containing 37 weight percent solids, 50% of which are $SiO_2$, is formulated by adding a commercially available aqueous dispersion of colloidal silica, having $SiO_2$ of approximately 13-14 millimicron particle size, to methyltrimethoxysilane which has been acidified by the addition of 2.5 weight percent glacial acetic acid. This composition is mixed for four hours and is then adjusted to a pH of 3.9 by addition of more glacial acetic acid. This acidified composition is then diluted to 18% solids by the addition of isopropanol and aged for four days to ensure formation of the partial condensate of $CH_3Si(OH)_3$.

EXAMPLE 3

This example is designed to illustrate a procedure of the instant invention for priming and then top coating polycarbonate articles and also the enhanced abrasion resistant properties obtained thereby. Various primer solutions are made containing 20% solids, which solids are the acrylic monomers of the instant invention, by combining the acrylic monomers with a catalytic amount of benzoyl peroxide in a solution of 20 parts by weight of ethyleneglycol diacetate and 80 parts by weight of butoxy ethanol and stirring under nitrogen for 24 hours at 75°–85° C. The coated solutions are flowed onto polycarbonate panels prepared in accordance with Example 1, allowed to drain, and heated at 250° F. for 15–30 minutes to evaporate the solvent. At this point, the polycarbonate panels have deposited thereon a thin primer layer containing a thermoplastic acrylic polymer containing functional groups. The primed test panels are then flow coated with the colloidal silica filled organopolysiloxane top coat composition prepared substantially in accordance with Example 2. Excess top coat solution is allowed to drain off and the coated panels are allowed to air dry for 30 minutes to evaporate off the solvent from the top coating composition. The panels are then baked for 1 hour at 125° C. to effect the cure of the organopolysiloxane.

These primed, top coated test panels are subjected to the above-described abrasion test and to an adhesion test which consists of using a multiple blade tool to cut parallel grooves about 1 mm apart through the coating into the substrate, rotating the sample 90° and repeating the cutting process thereby forming a grid pattern of 1 mm squares cut into the coating, and applying an adhesive tape over the cross-hatched area and quickly pulling said tape off (a sample fails the adhesion test if any of the squares in the grid are pulled off). The test panels are also subjected to the sunlamp aging test. This test is one wherein the sample undergoes severe exposure to ultraviolet radiation. In the sunlamp aging test, the coated samples are exposed to an RS-sunlamp, and after exposure for a predetermined period of time are removed and subjected to the adhesion test.

The results obtained from the above tests, as well as the thermoplastic monomers used in formulating the primer and the thickness of the primer coating are set forth in Table II.

composition prepared substantially in accordance with Example 2. Excess top coat composition is permitted to drain off and the coated unprimed test panels are air dried for 30 minutes to evaporate the solvent, followed by a one-hour bake at 250° F. to cure the further curable organopolysiloxane. These unprimed coated test panels are subjected to the aforedescribed adhesion tests (both before and after exposure to the RS sunlamp) and the results are set forth in Table III.

TABLE III

| Initial Adhesion | Adhesion after RS sunlamp exposure |
|---|---|
| Marginal* | Fails after 36 hours |

*The results of the adhesion test before exposure were uneven. That is to say, some samples failed the adhesion test while other samples passed the adhesion test.

As can be seen from Tables II and III, the adhesion, both before and after exposure to the RS sunlamp, of the colloidal silica filled organopolysiloxane top coat to the polycarbonate substrate primed in accordance with the present invention is markedly superior as compared with the adhesion of the colloidal silica filled organopolysiloxane top coat to an unprimed polycarbonate substrate.

EXAMPLE 5

This example is likewise designed to illustrate the criticality of the particular combination of the thermoplastic acrylic polymer primer layer and silica filled organopolysiloxane top coat in providing a durable and tenaciously adhered coating effective to produce an abrasion resistant polycarbonate article. EV-6174, a commercially available thermosettable acrylic (32% solids in butanol) available from Bee Chemical Company, is diluted with n-butanol to various solids concen-

TABLE II

| Thermoplastic Acrylic Polymer | Thickness, in mils, of Primer | Initial Adhesion | % Δ Haze, 300 Cycles | Adhesion, Hours Exposure to RS Sunlamp |
|---|---|---|---|---|
| Control of Example 1 | — | — | 34 | — |
| 95% ethyl methacrylate 5% γ-methacryloxy-propyltrimethoxysilane | 0.05 | Pass | 2.4 | Pass after 426 hours |
| 90% methyl methacrylate 10% hydroxyethyl methacrylate | 0.15 | Pass | 5.9 | Pass after 521 hours |
| 96% isobutyl methacrylate 5% hydroxyethyl methacrylate | 0.26 | Pass | 6.6 | Pass after 766 hours |
| 97.5% methyl methacrylate 1% hydroxyethyl methacrylate | 0.3 | Pass | 5.7 | Pass after 426 hours |
| 97.5% methyl methacrylate 2.5% hydroxyethyl methacrylate | 0.4 | Pass | 5.3 | Pass after 521 hours |

EXAMPLE 4

This example is designed to illustrate the criticality of the particular combination of the thermoplastic acrylic polymer primer layer containing functional groups and silica filled organopolysiloxane top coat in providing a durable and tenaciously adhered coating effective to produce an abrasion resistant polycarbonate article. Unprimed polycarbonate panels are prepared substantially in accordance with Example 1 and are flow-coated with a silica filled organopolysiloxane top coat composition prepared substantially in accordance with Example 1. The polycarbonate panels are then removed from the priming solutions and are allowed to remain in the open air for about 30 minutes, during which time the solvent from the priming solutions evaporates and deposits a thin priming film on the polycarbonate surface. The primed test panels are then flow coated with a silica filled organopolysiloxane top coat composition prepared substantially in accordance with Example 2. Excess top coat composition is permitted to drain off and the test panels are air dried for 30 minutes and are thereafter subjected to 1 hour of heating at 125° C. These primed and top coated test panels are subjected to the aforedescribed adhesion test (both before and after exposure to the RS sunlamp) and to the abrasion test. The results of these tests, as well as the concentration of the thermosettable acrylic in the primer solution and the thickness of the primer layer are set forth in Table IV.

TABLE IV

| % Solids in n-butanol solution | Primer thickness (mils) | % Haze | Initial adhesion | Adhesion after RS sunlamp exposure |
|---|---|---|---|---|
| 1 | 0.007 | 4.4 | Pass | Fail after 96 hours |
| 2 | 0.014 | 5.9 | Pass | Fail after 96 hours |
| 5 | 0.047 | 8.3 | Pass | Fail after 96 hours |
| 10 | 0.116 | 11.2 | Pass | Fail after 96 hours |

A comparison of Tables II and IV shows that the instant thermoplastic acrylic polymer containing functional groups primer layer results in a coating having markedly superior durability after exposure to UV-aging under the RS sunlamp as compared with a coating which contains a thermosettable acrylic primer layer. Furthermore, it is apparent from Table IV that with a thermosettable acrylic primer the abrasion resistance provided by the coating deteriorates as the thickness of the primer layer increases. This is not the case with the thermoplastic acrylic polymer containing functional groups primers of the present invention.

Thus, a particular advantage of the instant thermoplastic acrylic primers is that abrasion resistance after coating with a silicone top coat is not a function of primer layer thickness. It is well known to those skilled in the art that wedging occurs during the coating of large polycarbonate sheets. Thus, it is a great advantage if a property such as abrasion resistance is not dependent upon primer coating thickness.

A further advantage of having a thick primer coating is that ultraviolet light and other stabilizers can effectively be incorporated in the coating. Polycarbonate generally undergoes photodegradation and turns yellow during prolonged weathering. However, if the surface of polycarbonate can be protected from ultraviolet light, it can be stabilized against photodegradation. Incorporation of ultraviolet light-absorbers in a coating on polycarbonate is therefore highly desirable since these materials will screen ultraviolet light from reaching the surface of the polycarbonate. For practical purposes, however, a coating must generally be at least about 0.2-0.3 mils thick to contain enough of an ultraviolet light-absorber so that enough ultraviolet light, for example more than 90% of the incident ultraviolet light, can be screened from the surface of the polycarbonate. Thinner primer coatings theoretically require much more ultraviolet light-absorbers to effectively screen more than 90% of incident ultraviolet light. Due to the fact that the primer layers of the instant invention can be relatively thick, since abrasion resistance is not dependent upon primer coating thickness, ultraviolet light-absorbers can therefore be effectively incorporated in the thermoplastic acrylic primers of the instant invention.

The foregoing disclosure of this invention is not to be considered as limiting, since many variations may be made by those skilled in the art without departing from the scope or spirit of the foregoing description. For example, although the above examples are limited to only a few of the very many thermoplastic acrylic polymers which can be employed in the present invention, it should be understood that the present invention includes a much broader class of such polymers as shown by formula III and the description preceding these examples.

What we claim as new and desire to secure by Letters Patent of the United States is:

1. A shaped non-opaque coated polycarbonate article having improved abrasion and chemical solvent resistance comprising a polycarbonate substrate having on at least one surface thereof (i) an adhesion promoting primer layer consisting essentially of a thermoplastic acrylic polymer containing functional groups; and (ii) having disposed on said primer layer a tenaciously and durably adhered top coat consisting essentially of a colloidal silica filled thermoset organopolysiloxane which is the condensation product of a silanol of the formula $RSi(OH)_3$ in which R is selected from the group consisting of alkyl radicals of 1 to 3 carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$.

2. The article of claim 1 wherein said primer layer contains an ultraviolet light absorber.

3. The article of claim 1 wherein said thermoset colloidal silica filled organopolysiloxane contains from about 10 to about 70 weight percent of colloidal silica.

4. The article of claim 1 wherein said thermoset colloidal silica filled organopolysiloxane is the condensation product of $CH_3Si(OH)_3$.

5. The article of claim 4 wherein said thermoset colloidal silica filled organopolysiloxane contains from about 10 to about 70 weight percent of colloidal silica.

6. The article of claim 1 wherein said functional groups are selected from the class consisting of hydroxyl, carboxyl, amine, epoxide, amide, SH, $SO_3H$, $COOR^2$ and $Si(OR^3)_3$ groups wherein $R^2$ and $R^3$ represent alkyl groups containing from 1 to about 20 carbon atoms.

7. The article of claim 6 wherein said thermoplastic acrylic polymer containing functional groups is a copolymer obtained by the copolymerization of at least one monomer selected from the class consisting of acrylic ester monomers and methacrylic ester monomers with at least one monomer selected from the class consisting of substituted acrylic ester monomers and substituted methacrylic ester monomers.

8. The article of claim 6 wherein said thermoplastic acrylic polymer containing functional groups is obtained by the polymerization of at least one monomer selected from the class consisting of acrylic ester monomers containing functional groups and methacrylic ester monomers containing functional groups.

9. A non-opaque coated polycarbonate article having improved abrasion and chemical solvent resistance comprising a polycarbonate substrate having on at least one surface thereof (i) an adhesion promoting primer layer consisting essentially of a thermoplastic acrylic polymer containing functional groups; and (ii) a tenaciously and durably adhered top coat on said primer layer consisting essentially of the cured product of a composition consisting essentially of a dispersion of colloidal silica in a lower aliphatic alcohol-water solution of the partial condensate of a silanol of the formula $RSi(OH)_3$ wherein R is selected from alkyl radicals containing from 1 to 3 carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$, said composition containing 10 to 50 weight percent solids consisting essentially of 10 to 70 weight percent colloidal silica and 30 to 90 weight percent of the partial condensate, said composition containing sufficient acid to provide a pH in the range of 3.0 to 6.0.

10. The article of claim 9 wherein said thermoplastic acrylic polymer containing functional groups is obtained by the polymerization of at least one monomer represented by the general formula $H_2C=CYCOOR^1X$ wherein Y is a hydrogen or a methyl radical, $R^1$ is a divalent saturated aliphatic hydrocarbon radical containing from 1 to about 20 carbon atoms, and X is selected from the class consisting of hydroxyl, carboxyl, amine, epoxide, amide, SH, $SO_3H$, $COOR^2$, and $Si(OR^3)_3$ radicals wherein $R^2$ and $R^3$ represent alkyl radicals containing from 1 to about 20 carbon atoms.

11. The article of claim 9 wherein said primer layer contains an ultraviolet light screening agent.

12. The article of claim 9 wherein said thermoplastic acrylic polymer containing functional groups is a copolymer obtained by the polymerization of (i) at least one monomer represented by the general formula $H_2C=CYCOOR^1X$ wherein Y is hydrogen or a methyl radical, $R^1$ is a divalent saturated aliphatic hydrocarbon group containing from 1 to about 20 carbon atoms, and X is selected from the class consisting of hydroxyl, carboxyl, amine, epoxide, amide, SH, $SO_3H$, $COOR^2$ and $Si(OR^3)_3$ groups wherein $R^2$ and $R^3$ represent alkyl radicals containing from 1 to about 20 carbon atoms; with (ii) at least one monomer represented by the general formula $H_2C=CY'COOR^4$ wherein Y is hydrogen or a methyl radical, and $R^4$ is an alkyl radical containing from 1 to about 20 carbon atoms.

13. The article of claim 12 wherein (i) is γ-methacryloxypropyltrimethoxy silane and wherein (ii) is ethyl methacrylate.

14. The article of claim 12 wherein (i) is hydroxyethyl methacrylate.

15. The article of claim 14 wherein (ii) is isobutyl methacrylate.

16. The article of claim 14 wherein (ii) is methyl methacrylate.

17. A non-opaque coated polycarbonate article comprising a polycarbonate substrate having on at least one surface thereof (i) an adhesion promoting primer layer consisting essentially of a thermoplastic acrylic polymer containing functional groups; and (ii) a top coat composition disposed on said primer layer, said top coat composition consisting essentially of a dispersion of colloidal silica in a lower aliphatic alcohol-water solution of the partial condensate of a silanol of the formula $RSi(OH)_3$ in which R is selected from the group consisting of alkyl radicals of 1 to 3 carbon atoms, the vinyl radical, the 3,3,3-trifluoropropyl radical, the gamma-glycidoxypropyl radical and the gammamethacryloxypropyl radical, at least 70 weight percent of the silanol being $CH_3Si(OH)_3$, said composition containing 10 to 50 weight percent solids consisting essentially of 10 to 70 weight percent colloidal silica and 30 to 90 weight percent of the partial condensate, said composition containing sufficient acid to provide a pH in the range of 3.0 to 6.0.

18. The article of claim 17 wherein said primer layer contains an ultraviolet light absorber.

19. The article of claim 17 wherein said thermoplastic acrylic polymer containing functional groups has a molecular weight of at least 15,000.

20. The article of claim 19 wherein said thermoplastic acrylic polymer containing functional groups is obtained by the polymerization of (i) at least one monomer represented by the general formula $H_2C=CYCOOR^1X$ wherein Y is hydrogen or a methyl radical, $R^1$ is a divalent saturated aliphatic hydrocarbon radical containing from 1 to about 20 carbon atoms, and X is selected from the class consisting of hydroxyl, carboxyl, amine, epoxide, amide, SH, $SO_3H$, $COOR^2$ and $Si(OR^3)_3$ groups wherein $R^2$ and $R^3$ represent alkyl radicals containing from 1 to about 20 carbon atoms, with (ii) at least one monomer represented by the general formula $H_2C=CY'COOR^4$ wherein Y' is hydrogen or a methyl radical, and $R^4$ is an alkyl radical containing from 1 to about 20 carbon atoms.

21. The article of claim 19 wherein said thermoplastic acrylic polymer containing functional groups is obtained by the polymerization of at least one monomer represented by the general formula $H_2C=CYCOOR^1X$ wherein Y is hydrogen or a methyl radical, $R^1$ is a bivalent saturated aliphatic hydrocarbon radical containing from 1 to about 20 carbon atoms, and X is selected from the class consisting of hydroxyl, carboxyl, amine, epoxide, amide, SH, $SO_3H$, $COOR^2$ and $Si(OR^3)_3$ radicals wherein $R^2$ and $R^3$ represent alkyl radicals containing from 1 to about 20 carbon atoms.

22. A shaped non-opaque coated polycarbonate article having improved abrasion and chemical solvent resistance comprising a polycarbonate substrate having on at least one surface thereof (i) an adhesion promoting primer layer consisting essentially of (A) a thermoplastic acrylic polymer containing functional groups, and (B) at least one ultraviolet light screening compound; and (ii) having disposed on said primer layer a tenaciously and durably adhered top coat consisting essentially of a colloidal silica filled thermoset organopolysiloxane which is the condensation product of a silanol of the formula $RSi(OH)_3$ in which R is selected from the group consisting of alkyl radicals of 1 to 3 carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$.

23. The article of claim 22 wherein said acrylic polymer containing functional groups is obtained by:
(i) the polymerization of at least one monomer represented by the general formula $H_2C=CYCOOR^1X$ with at least one monomer represented by the general formula $H_2C=CY^1COOR^4$; or,
(ii) the polymerization of at least one monomer represented by the general formula $H_2C=CYCOOR^1X$, wherein Y and $Y^1$ independently represent a hydrogen or a methyl radical, $R^1$ represents a divalent saturated aliphatic hydrocarbon radical containing from 1 to about 20 carbon atoms, $R^4$ represents an alkyl radical containing from 1 to about 20 carbon atoms, and X is selected from the class consisting of hydroxyl, carboxyl, amine, epoxide, amide, SH, $SO_3H$, $COOR^2$ and $Si(OR^3)_3$ radicals wherein $R^2$ and $R^3$ represent alkyl radicals containing from 1 to about 20 carbon atoms.

24. The article of claim 23 wherein said thermoset colloidal silica filled organopolysiloxane contains from about 10 to about 70 weight percent of colloidal silica.

25. A shaped non-opaque coated polycarbonate article having improved abrasion and chemical solvent resistance comprising a polycarbonate substrate having disposed on at least one surface thereof (i) an adhesion promoting primer layer consisting essentially of (A) a thermoplastic acrylic polymer containing functional groups, and (B) at least one ultraviolet light screening compound; and (ii) having disposed on said primer layer a tenaciously and durably adhered top coat consisting essentially of the cured product of a composition consisting essentially of a dispersion of colloidal silica in a lower aliphatic alcohol-water solution of the partial condensate of a silanol of the formula $RSi(OH)_3$ in which R is selected from the group consisting of alkyl radicals of 1 to 3 carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$, said composition containing 10 to 50 weight percent solids consisting essentially of 10 to 70 weight percent colloidal silica and 30 to 90 weight percent of the partial condensate, said composition containing sufficient acid to provide a pH in the range of 3.0 to 6.0.

26. The article of claim 25 wherein said acrylic polymer containing functional groups is obtained by:
(I) the polymerization of at least one monomer represented by the general formula $H_2C\!\!=\!\!CYCOOR^1X$ with at least one monomer represented by the general formula $H_2C\!\!=\!\!CY^1COOR^4$; or,
(II) the polymerization of at least one monomer represented by the general formula $H_2C\!\!=\!\!CYCOOR^1X$, wherein Y and $Y^1$ independently represent a hydrogen or a methyl radical, $R^1$ represents a divalent saturated aliphatic hydrocarbon radical containing from 1 to about 20 carbon atoms, $R^4$ represents an alkyl radical containing from 1 to about 20 carbon atoms, and X is selected from the class consisting of hydroxyl, carboxyl, amine, epoxide, amide, SH, $SO_3H$, $COOR^2$ and $Si(OR^3)_3$ radicals wherein $R^2$ and $R^3$ represent alkyl radicals containing from 1 to about 20 carbon atoms.

* * * * *